(12) United States Patent
Ito et al.

(10) Patent No.: US 12,097,638 B2
(45) Date of Patent: Sep. 24, 2024

(54) EXTRUSION MOLDING MACHINE AND METHOD FOR PRODUCING MOLDED BODY

(71) Applicant: NGK INSULATORS, LTD., Nagoya (JP)

(72) Inventors: Keita Ito, Nagoya (JP); Yuichi Tajima, Nagoya (JP); Yoshimasa Kondo, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/447,476

(22) Filed: Sep. 13, 2021

(65) Prior Publication Data
US 2022/0111558 A1   Apr. 14, 2022

(30) Foreign Application Priority Data
Oct. 12, 2020   (JP) .................... 2020-172210

(51) Int. Cl.
*B28B 17/00*   (2006.01)
*B28B 3/20*   (2006.01)
(Continued)

(52) U.S. Cl.
CPC .......... *B28B 17/0081* (2013.01); *B28B 3/201* (2013.01); *B28B 3/2654* (2013.01);
(Continued)

(58) Field of Classification Search
CPC ....... B28B 3/2654; B28B 3/206; B28B 3/269; B28B 2003/203; B29C 48/0022; B29C 48/11
See application file for complete search history.

(56) References Cited

U.S. PATENT DOCUMENTS 2,702,408 A * 2/1955 Hartland ................. B29C 48/06
                                                            425/197
3,496,603 A * 2/1970 Julius .................... B29C 48/395
                                                            425/208
(Continued)

FOREIGN PATENT DOCUMENTS

DE   2 111 763 A   9/1971
DE   2 140 194 A   2/1973
(Continued)

OTHER PUBLICATIONS

German Office Action (Application No. 10 2021 210 736.2) dated Feb. 25, 2023 (with English translation).
(Continued)

*Primary Examiner* — Jacob T Minskey
*Assistant Examiner* — Caroline Beha
(74) *Attorney, Agent, or Firm* — BURR PATENT LAW, PLLC

(57) ABSTRACT

An extrusion molding machine includes: a molding portion having one end and other end, the one end having a die, the other end being connected to an extrusion port of an extrusion portion, the molding portion also including a screen arranged therein. The molding portion includes: at least one first temperature controlling member between the screen and the die, the first temperature controlling member including a plurality of first zones divided in a circumferential direction. Temperatures of the plurality of first zones can be individually controlled.

9 Claims, 6 Drawing Sheets

(51) Int. Cl.
  *B28B 3/26* (2006.01)
  *B28B 11/16* (2006.01)
  *B29C 48/00* (2019.01)
  *B29C 48/11* (2019.01)

(52) U.S. Cl.
  CPC .......... *B28B 11/16* (2013.01); *B29C 48/0022* (2019.02); *B29C 48/11* (2019.02)

(56) References Cited

U.S. PATENT DOCUMENTS

| | | | | |
|---|---|---|---|---|
| 3,588,987 | A * | 6/1971 | Korostoff et al. | B29C 48/3003 264/225 |
| 4,459,250 | A * | 7/1984 | Miura | B29C 48/872 264/45.9 |
| 4,913,863 | A * | 4/1990 | Burrafato | B29C 48/06 264/177.17 |
| 5,382,147 | A * | 1/1995 | Miura | B29C 45/72 425/549 |
| 6,620,354 | B1 * | 9/2003 | Listner | B29C 48/276 264/209.4 |
| 2002/0014710 | A1 | 2/2002 | Tsuruta et al. | |
| 2004/0164464 | A1 | 8/2004 | Lubberts et al. | |
| 2008/0073818 | A1 * | 3/2008 | Pelcz | B29C 48/9125 425/72.1 |
| 2014/0151915 | A1 * | 6/2014 | Sariego | B28B 3/2654 425/144 |

FOREIGN PATENT DOCUMENTS

| | | | |
|---|---|---|---|
| DE | 92 09 514 U1 | 10/1992 | |
| EP | 0 153 511 A1 | 9/1985 | |
| GB | 1 396 164 A | 6/1975 | |
| JP | 2006-518294 A | 8/2006 | |
| JP | 2008-119891 A | 5/2008 | |
| JP | 2013193278 A * | 9/2013 | ............. B28B 3/206 |
| WO | 2013/137346 A1 | 9/2013 | |

OTHER PUBLICATIONS

Chinese Office Action dated Jun. 29, 2023 (Application No. 202110822391.5).

Japanese Office Action (with English translation) dated Jul. 25, 2023 (Application No. 2020-172210).

* cited by examiner

| | Example 1-1 | Example 1-2 | Comparative Example 1 |
|---|---|---|---|
| Cross-Sectional Shape |  |  |  |
| Maximum Deviation (mm) | 0.3 | 0.1 | 0.6 |
| Temperature Distribution ■ 50°C ▨ 35°C □ 20°C |  |  |  |

|  | Example 2 | Comparative Example 2 |
|---|---|---|
| Cross-Sectional Shape |  |  |
| Maximum Deviation (mm) | 0.1 | 0.7 |
| Temperature Distribution ■ 50°C ▨ 35°C □ 20°C |  |  |

| | Example 3 | Comparative Example 3 |
|---|---|---|
| Cross-Sectional Shape |  |  |
| Maximum Deviation (mm) | 0.1 | 0.5 |
| Temperature Distribution ■ 50°C ▨ 35°C ▢ 20°C |  |  |

EXTRUSION MOLDING MACHINE AND METHOD FOR PRODUCING MOLDED BODY

FIELD OF THE INVENTION

The present invention relates to an extrusion molding machine and a method for producing a molded product.

BACKGROUND OF THE INVENTION

Extrusion molding machines are used for producing various molded bodies. For example, in the production of a honeycomb-shaped ceramic structure used for a catalyst support for purifying an automobile exhaust gas, a diesel particulate filter (DPF), a gasoline particulate filter (GPF), a heat storage body for a combustion device, and the like, a honeycomb-shaped ceramic molded body is mainly produced using an extrusion molding machine in terms of productivity.

By the way, a ceramic structure used for applications such as DPFs and GPFs tends to cause problems such as cracking due to thermal stress or the like, if the ceramic structure has low dimensional accuracy. Therefore, high dimensional accuracy is also required for a ceramic molded body before firing. In particular, it is difficult to ensure dimensional accuracy of an outer circumference portion of a deformed honeycomb molded body having a cross section with an oval shape or the like, which is orthogonal to a cell extending direction Therefore, Patent Literature 1 proposes a technique for suppressing warpage of a molded body due to a non-uniform flow of a molding material passing through a die by providing a bow deflector device upstream of the die. The bow deflector device can mechanically control the flow of the molding material, so that the dimensional accuracy of the outer circumference portion may be ensured.

CITATION LIST

Patent Literatures

[Patent Literature 1] Japanese Patent Application Publication No. 2006-518294 A

SUMMARY OF THE INVENTION

The present invention relates to an extrusion molding machine comprising a molding portion having one end and other end, the one end having a die, the other end being connected to an extrusion port of an extrusion portion, the molding portion also comprising a screen arranged therein,
wherein the molding portion comprises: at least one first temperature controlling member between the screen and the die, the first temperature controlling member comprising a plurality of first zones divided in a circumferential direction, wherein temperatures of the plurality of first zones can be individually controlled.

Further, the present invention relates to a method for producing a molded body, the method comprising:
a molding step of extruding a molding material using the extrusion molding machine to obtain a molded body;
a temperature distribution measuring step of measuring a temperature distribution of a cross section orthogonal to an extrusion direction of the molded body;
a cutting step of cutting the molded body to a predetermined length; and
a dimension measuring step of measuring a dimension of the cut molded body,
wherein a relationship between a temperature of each of the first zones of the first temperature controlling member in the extrusion molding machine, and the temperature distribution of the molded body in the temperature distribution measuring step and the dimension of the molded body in the dimension measuring step is determined in advance, and based on the relationship, an appropriate temperature of each of the first zones is calculated from the temperature distribution of the molded body measured in the temperature distribution measuring step and the dimension of the molded body measured in the dimension measuring step, and each of the first zones is controlled to the appropriate temperature in the molding step.

DETAILED DESCRIPTION OF THE INVENTION

When the flow of the molding material is mechanically controlled by the bow deflector device, the flow rate of the molding material is easily changed in the molding portion, resulting in clogging with the molding material. Therefore, even if the bow deflector device is used, it is difficult to stably ensure the dimensional accuracy of the outer circumference portion.

The present invention has been made to solve the above problems. An object of the present invention is to provide an extrusion molding machine that can produce a molded body having high dimensional accuracy of an outer circumference portion.

Another object of the present invention is to provide a method for producing a molded body having high dimensional accuracy of an outer circumference portion.

As a result of intensive studies for an extrusion molding machine including a molding portion which has a die at one end, the other end being connected to an extrusion port of an extrusion portion, and which has a screen arranged therein, the present inventors have found that a temperature control in a region between the screen and the die is closely related to the dimensional accuracy of the outer circumference portion of the molded body. Further, the present inventors have found that the above problems can be solved by providing a first temperature controlling member including a plurality of first zones divided in a circumferential direction, and individually controlling the plurality of first zones, and have completed the present invention.

According to the present invention, it is possible to provide an extrusion molding machine that can produce a molded body having high dimensional accuracy of an outer circumference portion.

Further, according to the present invention, it is possible to provide a method for producing a molded body having high dimensional accuracy of an outer circumference portion.

Hereinafter, embodiments according to the present invention will be specifically described. It is to understand that the present invention is not limited to the following embodiments, and various modifications and improvements, which will be within the scope of the present invention, may be made based on ordinary knowledge of a person skilled in the art, without departing from the spirit of the present invention.

Embodiment 1

Figure 1:
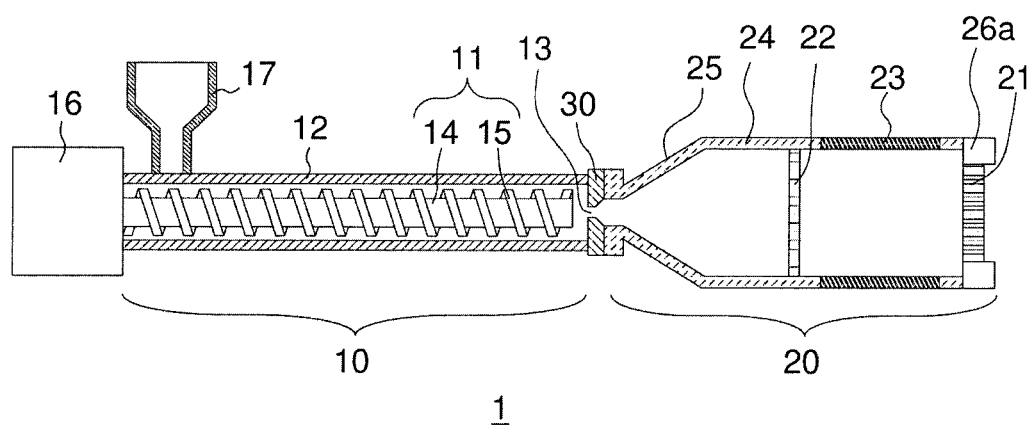
FIG. 1 is a schematic view showing a schematic structure of an extrusion molding machine according to Embodiment 1 of the present invention.

FIG. 1 is a schematic view showing a schematic structure of an extrusion molding machine according to Embodiment 1 of the present invention.

As shown in FIG. 1, an extrusion molding machine 1 according to Embodiment 1 of the present invention includes: an extrusion portion 10; and a molding portion 20 connected to the extrusion portion 10.

The extrusion portion 10 is not particularly limited as long as it has a structure capable of extruding a molding material into the molding portion 20.

The molding portion 20 has a die 21 at one end, and the other end is connected to an extrusion port 13 of the extrusion portion 10, and a screen 22 is arranged in the interior of the molding portion 20. Further, the molding portion 20 has a first temperature controlling member 23 between the screen 22 and the die 21.

Figure 2:
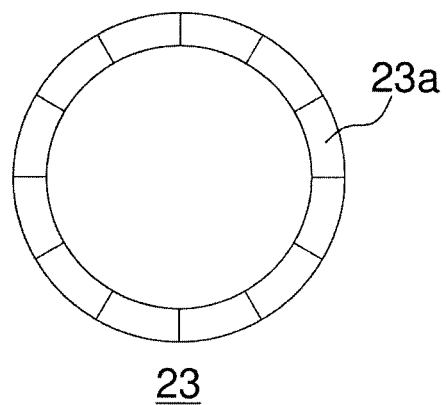
FIG. 2 is a cross-sectional view of a first temperature controlling member orthogonal to an extrusion direction of a molding material.

Here, FIG. 2 shows a cross-sectional view of the first temperature controlling member 23 orthogonal to the extrusion direction of the molding material.

As shown in FIG. 2, the first temperature control member 23 includes a plurality of first zones 23a divided in the circumferential direction. The plurality of first zones 23a are configured so as to control the temperature individually. Therefore, each of the plurality of first zones 23a can be controlled to a different temperature. It should be noted that FIG. 2 shows an embodiment having twelve first zones 23a, as an example.

In the extrusion molding machine 1 having the above structure, the flow rate of the molding material flowing near each of the first zones 23a can be controlled according to the positions by individually controlling the temperatures of the plurality of first zones 23a. Therefore, it will be easy to extrude the molding material into a molded body having a desired shape, particularly a shape of an outer circumference portion of a molded body having a deformed cross-sectional shape orthogonal to the extrusion direction, so that the molded body having high dimensional accuracy of the outer circumference portion can be produced.

The set temperatures of the plurality of first zones 23a vary depending on the shape of the molded body to be produced (particularly, the cross-sectional shape orthogonal to the extrusion direction) and characteristics of the molding material to be used. For example, by increasing the temperature of the first zone 23a at a specific position, the flow rate of the molding material near that position tends to be increased. Therefore, when extruding a molded body having a deformed shape in which a specific position is expanded as compared with a circular cross-sectional shape orthogonal to the extrusion direction, it is easier to obtain the desired shape by increasing the temperature of the first zone 23a near that position.

Hereinafter, members forming the extrusion molding machine 1 according to Embodiment 1 of the present invention will be described in detail.

(Extrusion Portion 10)

The extrusion portion 10 is not particularly limited as long as it has a screw 11 and a barrel 12 capable of housing the screw 11, and extrusion portions known in the art may be used.

The screw 11 preferably has a screw shaft 14 and a blade portion 15 formed spirally along the screw shaft 14.

Further, the screw 11 may preferably be a biaxial screw that rotates in the same direction, and more preferably a meshing type biaxial screw, in terms of kneadability of the molding material, particularly a ceramic molding material. In this case, a pair of screws 11 are arranged parallel to each other in the barrel 12.

A base portion of the screw 11 is connected to a drive device 16. The drive device 16 includes a motor and a gearbox (not shown), and rotates the screw 11 while controlling a rotation speed so as to obtain a predetermined extrusion pressure.

The upstream side of the extrusion portion 10 is provided with a material input portion 17 for feeding the molding material into the extrusion portion 10. The molding material fed from the material input portion 17 is kneaded by the screw 11 and fed to the molding portion 20.

(Molding Portion 20)

The molding portion 20 includes a drum 24 having a space therein, and one end of the drum 24 has the die 21, and the other end is connected to the extrusion port 13 of the extrusion portion 10.

A shape of the drum 24 is not particularly limited, and a part of the drum 24 may include a diameter decreased part or a diameter increased part. For example, as shown in FIG. 1, the drum 24 has a diameter increased part 25 on the extrusion port 13 side. The drum 24 having such a structure may be composed of a single member, or a plurality of members. When the drum 24 is composed of a plurality of members, the drum 24 can be obtained by combining a diameter increased drum with a straight drum.

A shape of the die 21 is not particularly limited, and it may be appropriately set depending on the shape of the molded body to be produced. For example, when producing a molded body having a honeycomb shape, the die 21 having slits corresponding to a thickness of each partition wall of the honeycomb molded body may be used.

The die 21 is held by a die holding member 26a. The die holding member 26a is arranged such that the die 21 is located at one end of the molding portion 20.

The die holding member 26a is not particularly limited, and a member known in the art may be used.

The screen 22 (filtration net) arranged inside the drum 24 (molding portion 20) is made of a mesh-shaped material, which can remove coarse particles or other impurities mixed in the molding material, and stabilize the molding material fed to the die 21.

The first temperature controlling member 23 includes the plurality of first zones 23a divided in the circumferential direction as described above. A method of heating each first zone 23a is not particularly limited as long as it can individually control the temperature. For example, each first zone 23a is formed such that a fluid passes through its interior and a temperature of the fluid is adjusted, whereby the temperature of each first zone 23a can be controlled. Also, the temperature of each first zone 23a may be controlled by providing each first zone 23a with a heating mean such as a heating element or a cooling means such as a cooling element. For example, hot water heated by using a boiler or the like can be circulated through each first zone, thereby heating each first zone 23a. Further, cold water cooled by using a chiller or the like can be circulated through each first zone 23a, thereby cooling each first zone 23a.

The number of the first zones 23a divided in the circumferential direction may be appropriately set according to the shape of the molded body to be produced, and are not particularly limited. The number is preferably from 4 to 24, and more preferably from 8 to 20, and most preferably from 10 to 16. By setting the number of the first zones 23a in such a range, the dimensional accuracy of molded bodies having various shapes can be improved.

The number of the first temperature controlling member 23 arranged between the screen 22 and the die 21 may be 2 or more, although not particularly limited thereto. By providing two or more first temperature controlling members 23, the temperature of the molding material flowing in the molding portion 20 can be finely controlled, so that the dimensional accuracy can be further improved. As the number of the first temperature controlling members 23 is lager, the effect of improving the dimensional accuracy of the molded body would be higher. However, in view of production costs and the like, it would be realistic that the number of the first temperature controlling member 23 is 5 or less.

When two or more first temperature controlling members 23 are provided between the screen 22 and the die 21, a heat insulating member is preferably arranged between the two or more first temperature controlling members 23.

The heat insulating member may preferably have a thermal conductivity of 0.5 W/m·K or less, although not particularly limited thereto. The heat insulating member having such a thermal conductivity can sufficiently ensure the heat insulating effect between the respective first temperature controlling members 23. In addition, a lower thermal conductivity of the heat insulating member is preferable, because it provides a higher heat insulating effect. However, the lower limit of the thermal conductivity is 0.02 W/m·K in view of available materials. Further, as used herein, the "thermal conductivity" refers to a thermal conductivity measured at 25° C.

A material of the heat insulating member is not particularly limited as long as it has heat insulating properties. Preferably, the heat insulating member is made of a heat insulating resin.

The heat insulating resin is not particularly limited, and resins known in the art may be used. Examples of the heat insulating resin include synthetic resins such as polyacetal resins, polyamide resins, polyethylene resins, and polypropylene resins.

(Rectifying Board 30)

A rectifying board 30 may optionally be arranged between the extrusion portion 10 and the molding portion 20. The rectifying board 30 has through holes and has a function of adjusting the behavior of the molding material.

The number, position and shape of the through holes are not particularly limited, and they may be set as needed.

A material of the rectifying board 30 may be an iron-based material, stainless steel-based material, or the like, although not particularly limited thereto.

It should be noted that the outer circumference of the drum 24 (molding portion 20) may be covered with a heat insulating sheet (not shown). Such a configuration can allow a constant temperature to be maintained in the drum 24, so that the uniformity of the temperature distribution of the molding material in the cross section orthogonal to the extrusion direction of the molding material can be improved, and the effect of improving the dimensional accuracy of the molded body can be enhanced.

The extrusion molding machine 1 having the above structure can be used for producing a molded body. In particular, the extrusion molding machine 1 is suitable for use in producing a ceramic molded body with a ceramic molding material, particularly a ceramic honeycomb molded body.

The method for producing the molded body according to Embodiment 1 of the present invention is carried out using the extrusion molding machine 1 having the above structure.

More particularly, the method for producing the molded body according to the Embodiment 1 of the present invention includes: a molding step of extruding a molding material using the extrusion molding machine 1 to obtain a molded body; a temperature distribution measuring step of measuring a temperature distribution of a cross section orthogonal to an extrusion direction of the molded body; a cutting step of cutting the molded body to a predetermined length; and a dimension measuring step of measuring a dimension of the cut molded body.

(Molding Step)

The molding step is a step of extruding a molding material using the extrusion molding machine 1 to obtain a molded body. In the molding step, a temperature of each first zone 23a of the first temperature controlling member 23 is determined based on results of the temperature distribution of the molded body measured in the temperature distribution measuring step and the dimension measured in the dimension measuring step. More particularly, a relationship between the temperature of each of the first zones 23a of the first temperature controlling member 23 in the extrusion molding machine 1, and the temperature distribution of the molded body in the temperature distribution measuring step and the dimension of the molded body in the dimension measuring step is determined in advance, and based on the relationship, an appropriate temperature of each of the first zone 23a is calculated from the temperature distribution of the molded body measured in the temperature distribution measuring step and the dimension of the molded body measured in the dimensional measurement step, and each of the first zones 23a is controlled to the appropriate temperature in the molding step.

The relationship between the temperature of each of the first zones 23a of the first temperature controlling member 23 in the extrusion molding machine 1, and the temperature distribution of the molded body in the temperature distribution measuring step and the dimension of the molded body in the dimension measuring step can be determined based on past data accumulated by carrying out the production of the molded bodies. Further, by reflecting the data obtained by continuously carrying out the method for producing the molded body according to Embodiment 1 of the present invention, that relationship can be optimized in real time.

The relationship between the temperature of each of the first zones 23a of the first temperature controlling member 23 in the extrusion molding machine 1, and the temperature distribution of the molded body in the temperature distribution measuring step and the dimension of the molded body in the dimension measuring step may vary depending on conditions such as materials and sizes of molded bodies, and a type of the extrusion molding machine 1. Therefore, the relationship is preferably determined under the same conditions.

The temperature distribution of the molded body used to obtain the relationship is not particularly limited. It is preferable to use the temperature distribution of the cross section orthogonal to the extrusion direction of the molded body immediately after being obtained in the molding step. The temperature distribution can be measured using an infrared thermography camera (Thermo GEAR G120EX from Nippon Avionics Co., Ltd.).

The dimension of the molded body used to obtain the relationship is not particularly limited, but it is preferable to use a diameter of the cut surface of the molded body cut in a direction orthogonal to the extrusion direction (for example, a radius or diameter of a cut surface when the molded body is cylindrical), and it is more preferable to use a value ($\Delta R$) obtained by subtracting a previously defined reference value of a diameter of a cut surface of a reference molded body from a measured value of a diameter of a cut surface of a molded body. By using these, it will be easy to obtain correlation of that relationship.

As used herein, the "reference molded body" means a molded body having ideal (target) dimension.

In the molding step, the molding material is fed from the material input portion 17 to the interior of the barrel 12. The molding material is kneaded while being subjected to a shearing force by the rotation of the screw 11, and is conveyed to the extrusion port 13 side at the tip of the barrel 12. The molding material extruded from the extrusion port 13 of the barrel 12 passes through the through holes of the rectifying board 30, passing through the screen 22, and is fed to the die 21 while being temperature-controlled by the temperature controlling member 23. The molding material is then extruded through the die 21 to obtain a molded body having a desired shape.

The molding material used in the method for producing the molded body is not particularly limited. For example, a ceramic molding material may be used. The ceramic molding material includes ceramic raw materials. Examples of ceramic raw materials include cordierite-forming raw materials, cordierite, silicon carbide, silicon-silicon carbide composite materials, mullite, aluminum titanate, and the like. The cordierite-forming raw material refers to a ceramic raw material blended so as to have a chemical composition where silica is in a range of from 42 to 56% by mass, alumina is in a range of from 30 to 45% by mass, and magnesia is in a range of from 12 to 16% by mass. Then, the cordierite-forming raw material is fired to form cordierite.

The ceramic molding material may optionally contain a dispersion medium, an organic binder, an inorganic binder, a pore former, a surfactant, and the like, in addition to the ceramic raw materials. Those components are not particularly limited, and those known in the art may be used.

(Temperature Distribution Measuring Step)

The temperature distribution measuring step measures the temperature distribution of the cross section orthogonal to the extrusion direction of the molded body.

The temperature distribution measuring step preferably employs the temperature distribution of the cross section orthogonal to the extrusion direction of the molded body immediately after being obtained in the molding step. The temperature distribution can be measured using an infrared thermography camera (Thermo GEAR G120EX from Nippon Avionics Co., Ltd.).

(Cutting Step)

The cutting step is a step of cutting the molded body obtained by extrusion molding to a predetermined length.

A cutting method is not particularly limited, and a method known in the art may be used. For example, the molded body can be cut by using a wire rod hung between a pair of bobbins.

The length of the molded body to be cut is not particularly limited, and the mold body may be cut to an appropriate length depending on applications.

The cut molded body may preferably have a honeycomb structure including partitions wall for defining a plurality of cells extending from a first end face to a second end face, although not particularly limited thereto.

The molded body having the honeycomb structure (hereinafter referred to as "honeycomb molded body") may have a cross-section shape orthogonal to a cell extending direction, such as a circular, oval, elliptic, and rounded rectangular shape, as well as a square, rectangular, triangular, pentagonal, hexagonal, octagonal, and other polygonal pillar shape, although not particularly limited thereto.

Further, the shape of each cell of the honeycomb molded body (a shape of each cell in the cross section orthogonal to the cell extending direction) may be a triangle, a quadrangle, a hexagon, an octagon, a circle, or a combination thereof, although not particularly limited thereto.

(Dimension Measuring Step)

The dimension measuring step is a step of measuring the dimension of the cut molded body.

A method for measuring the dimension of the cut molded body is not particularly limited, and a method known in the art may be used. For example, the dimension of the cut molded body can be measured using an end face inspection machine, a laser type outer diameter dimension measuring device, or the like.

However, the measuring method used in the dimension measuring step is preferably the same as that of the dimension of the molded body used to obtain the relationship between the temperature of each of the first zones 23a of the first temperature controlling member 23, and the dimension of the cut molded product. Further, the dimension of the cut molded body measured in the dimension measuring step is preferably the same as that of the molded body used to obtain the relationship between the temperature of each of the first zones 23a of the first temperature controlling member 23, and the dimension of the cut molded body.

The dimension of the cut molded body measured in the dimension measuring step may preferably be a diameter of the cut surface of the cut molded body (for example, a radius or diameter of a cut surface when the molded body is cylindrical), and more preferably a value ($\Delta R$) obtained by subtracting a previously defined reference value of a diameter of a cut surface of a reference molded body from a measured value of a measured diameter of the cut surface of the molded body, although not particularly limited thereto.

The dimension of the cut molded body can be measured on the end face (cut surface) or side surface of the cut molded body.

Further, the dimension of the cut molded body may be measured on the entire end face or side surface of the cut molded body, but the measurement is preferably performed on a part of the end face or side surface of the cut molded body.

When measuring the dimension of the cut molded body on the entire end face or side surface, the measurement must be performed while aligning an axial direction (extrusion molding direction) of the cut molded body with a vertical direction, so that the cut molded body must be rotated by 90° to measure the dimension, which will require a time. Therefore, the dimension is preferably measured on a part (for example, an upper half) of the end face or side surface of the molded body cut from the upper direction while maintaining the axial direction (extrusion molding direction) of the cut molded body in the horizontal direction. By performing such measurement, the measurement time can be shortened. In this case, it is preferable to perform a process of correcting the center position of the measured shape such that an error from the reference shape is minimized.

When measuring the dimension of the end face of the cut molded body, an end face image of the cut molded body is taken by an imaging camera forming the end face inspection machine. A contour of the cut molded body may be detected from the obtained end face image by image analysis, and the dimension (outer diameter or radius) of the cut molded body may be calculated.

When measuring the dimension of the side surface of the cut molded body, the side surface of the cut molded body is irradiated with a laser from a laser displacement meter forming the laser type outer diameter dimension measuring device. The laser oscillated from the laser displacement meter reaches the side surface of the cut molded body and rebounds. The rebounded laser may be detected by a light receiving element, and the dimension of the cut molded body may be calculated based on the principle of the triangulation ranging method.

The method for producing the molded body according to Embodiment 1 of the present invention including the above steps can improve the dimensional accuracy of the outer circumference portion of the molded body, because the temperature of each of the first zones 23a of the first temperature controlling member 23 in the molding step based on the measurement results of the temperature distribution of the molded body and the dimension of the molded body.

Embodiment 2

An extrusion molding machine according to Embodiment 2 of the present invention is the same as the extrusion molding machine 1 according to Embodiment 1 of the present invention, with the exception that the die holding member has a temperature control function. Therefore, here, the descriptions of the configurations common to those of the extrusion molding machine 1 will be omitted, and only different configurations will be described.

Figure 3:
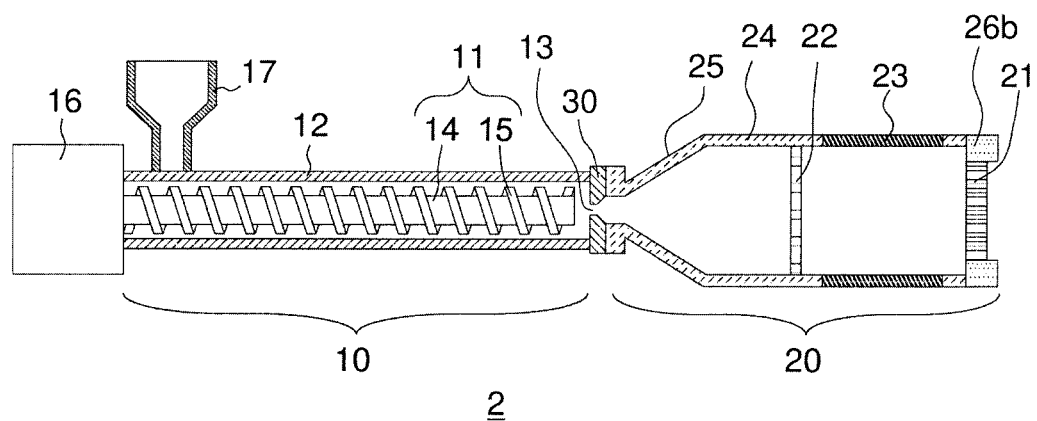
FIG. 3 is a schematic view showing a schematic structure of an extrusion molding machine according to Embodiment 2 of the present invention.

FIG. 3 is a schematic view showing a schematic structure of an extrusion molding machine according to Embodiment 2 of the present invention.

As shown in FIG. 3, an extrusion molding machine 2 according to Embodiment 2 of the present invention has a die holding member 26b that holds a die 21 and can control the temperature.

In the extrusion molding machine 1 according to Embodiment 1 of the present invention, the flow rate of the molding material is controlled according to the positions by individually controlling the temperatures of the plurality of first zones 23a of the first temperature controlling member 23, thereby removing the dimensional accuracy of the outer circumference portion. However, the dimensional accuracy of the outer circumference portion of the molded body may not be sufficiently improved only by the first temperature controlling member 23.

Therefore, in the extrusion molding machine 2 according to Embodiment 2 of the present invention, the dimensional accuracy of the outer circumference portion of the molded body can be stably improved by controlling the temperature of the die holding member 26b located downstream of the first temperature controlling member 23.

The die holding member 26b includes a plurality of second zones divided in the circumferential direction, as with the plurality of first zones 23a of the first temperature control member 23. A cross-sectional view of the die holding member 26b orthogonal to the extrusion direction of the molding material will be omitted because it is substantially the same as the first temperature controlling member 23 as shown in FIG. 2. The plurality of second zones are configured so as to control the temperatures individually. Therefore, each of the plurality of second zones can be controlled to a different temperature.

A heating method of each second zone is not particularly limited as long as the temperature can be individually controlled. For example, the temperature of each second zone can be controlled by forming each second zone such that the fluid can flow in each second zone and adjusting the temperature of the fluid. Further, the temperature of each second zone may be controlled by providing a heating means such as a heating element to each second zone.

The number of the second zones divided in the circumferential direction may be appropriately set depending on the shape of the molded body to be produced, and may preferably be from 4 to 24, and more preferably from 8 to 20, and most preferably from 10 to 16, although not particularly limited thereto. By setting the number of the second zones in such a range, it is possible to improve the dimensional accuracy of the outer circumference portions of the molded bodies having various shapes.

Further, the number of the second zones of the die holding member 26b may be the same as or different from that of the first zones 23a of the first temperature controlling member 23. Preferably, the number of them are the same as each other.

The method for producing the molded body according to Embodiment 2 of the present invention is carried out using the extrusion molding machine 2 having the structure as described above.

Specifically, in the method for producing the molded body according to Embodiment 2 of the present invention, in the molding step, temperatures of each first zone 23a of the first temperature controlling member 23 and each second zone of the die holding member 26b are determined based on results of the temperature distribution of the molded body measured in the temperature distribution measuring step and the dimension measured in the dimensional measuring step. More particularly, the relationship between the temperatures of each first zone 23a of the first temperature controlling member 23 and each second zone of the die holding member 26b in the extrusion molding machine 2, and the temperature distribution of the molded body in the temperature distribution measuring step and the dimension of the molded body in the dimension measuring step is determined in advance, and based on the relationship, appropriate temperatures of each first zone 23a and each second zone are calculated from the temperature distribution of the molded body measured in the temperature distribution measuring step and the dimension of the molded body measured in the dimension measuring step, and each first zone 23a and each second zone are controlled to the appropriate temperatures in the molding step.

The relationship between the temperatures of each first zone 23a of the first temperature controlling member 23 and each second zone of the die holding member 26b in the extrusion molding machine 2, and the temperature distribution of the molded body in the temperature distribution measuring step and the dimension of the molded body in the dimension measuring step can be determined based on past data accumulated by producing the molded bodies. Further, by reflecting the data obtained by continuously carrying out the method for producing the molded body according to Embodiment 2 of the present invention, that relationship can be optimized in real time.

The relationship between the temperatures of each first zone 23a of the first temperature controlling member 23 and each second zone of the die holding member 26b in the extrusion molding machine 2, and the temperature distribution of the molded body in the temperature distribution measuring step and the dimension of the molded body in the dimension measuring step may vary depending on conditions such as materials and sizes of the molded bodies, and the type of the extrusion molding machine 2. Therefore, that relationship is preferably determined under the same conditions.

Embodiment 3

An extrusion molding machine according to Embodiment 3 of the present invention is the same as the extrusion molding machine 1 according to Embodiment 1 of the present invention, with the exception that a second temperature controlling member is arranged in the diameter increased part 25 of the molding portion 20. Therefore, here, the descriptions of the configurations common to those of the extrusion molding machine 1 will be omitted, and only different configurations will be described.

Figure 4:
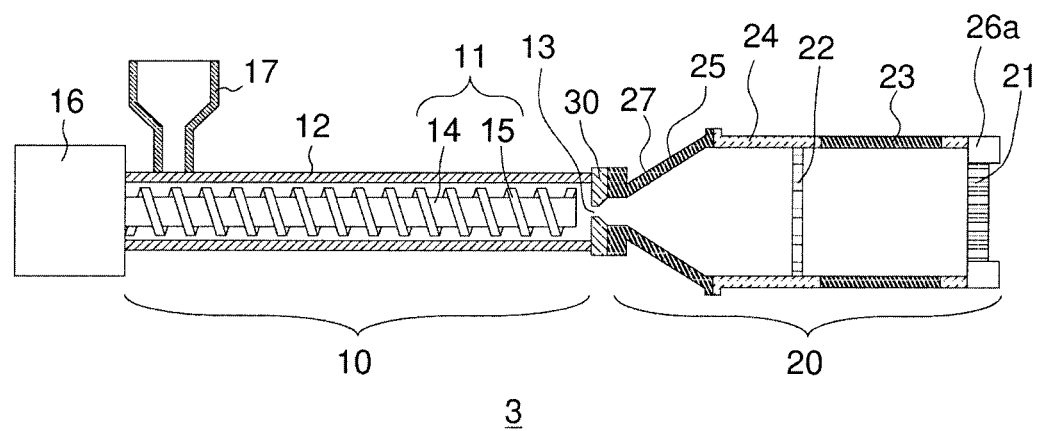
FIG. 4 is a schematic view showing a schematic structure of an extrusion molding machine according to Embodiment 3 of the present invention.

FIG. 4 is a schematic view showing a schematic structure of an extrusion molding machine according to Embodiment 3 of the present invention.

As shown in FIG. 4, an extrusion molding machine 3 according to Embodiment 3 of the present invention has the diameter increased part 25 between the other end of the molding portion 20 and the screen 22, and the diameter increased part 25 is provided with a second temperature controlling member 27.

In the extrusion molding machine 1 according to Embodiment 1 of the present invention, the temperatures of the plurality of first zones 23a of the first temperature controlling member 23 can be individually controlled to control the flow rate of the molding material according to the positions, thereby improving the dimensional accuracy of the outer circumference portion. However, depending on the state of the temperature distribution of the molding material before reaching the first temperature controlling member 23, the temperature cannot be controlled to a predetermined temperature only by the first temperature controlling member 23, so that the dimensional accuracy of the outer circumference portion of the molded body may not be sufficiently improved.

Therefore, in the extrusion molding machine 3 according to Embodiment 3 of the present invention, the temperature is previously controlled by the second temperature controlling member 27 of the diameter increased part 25 located upstream of the first temperature controlling member 23, so that the temperature control in the first temperature controlling member 23 can be stabilized, thereby stably improving the dimensional accuracy of the molded body.

The second temperature controlling member 27 includes a plurality of third zones divided in the circumferential direction, as with the plurality of first zones 23a of the first temperature control member 23. A cross-sectional view of the second temperature controlling member 27 orthogonal to the extrusion direction of the molding material will be omitted because it is substantially the same as the first temperature controlling member 23 as shown in FIG. 2. The plurality of third zones are configured so as to control the temperatures individually. Therefore, each of the plurality of third zones can be controlled to a different temperature.

A heating method of each third zone is not particularly limited as long as the temperature can be individually controlled. For example, the temperature of each third zone can be controlled by forming each third zone such that the fluid can flow in each third zone and adjusting the temperature of the fluid. Further, the temperature of each third zone may be controlled by providing a heating means such as a heating element to each third zone.

The number of the third zones divided in the circumferential direction may be appropriately set depending on the shape of the molded body to be produced, and may preferably be from 4 to 24, and more preferably from 8 to 20, and most preferably from 10 to 16, although not particularly limited thereto. By setting the number of the third zones in such a range, it is possible to improve the dimensional accuracy of the outer circumference portions of the molded bodies having various shapes.

Further, the number of the third zones of the second temperature controlling member 27 may be the same as or different from that of the first zones 23a of the first temperature controlling member 23. Preferably, the number of them are the same as each other.

The method for producing the molded body according to Embodiment 3 of the present invention is carried out using the extrusion molding machine 3 having the structure as described above.

Specifically, in the method for producing the molded body according to Embodiment 3 of the present invention, in the molding step, the temperatures of each first zone 23a of the first temperature controlling member 23 and each third zone of the second temperature controlling member 27 are determined based on results of the temperature distribution of the molded body measured in the temperature distribution measuring step and the dimension measured in the dimensional measuring step. More particularly, the relationship between the temperatures of each first zone 23a of the first temperature controlling member 23 and each third zone of the second temperature controlling member 27 in the extrusion molding machine 3, and the temperature distribution of the molded body in the temperature distribution measuring step and the dimension of the molded body in the dimension measuring step is determined in advance, and based on the relationship, appropriate temperatures of each first zone 23a and each third zone are calculated from the temperature distribution of the molded body measured in the temperature distribution measuring step and the dimension of the molded body measured in the dimension measuring step, and each first zone 23a and each third zone are controlled to the appropriate temperatures in the molding step.

The relationship between the temperatures of each first zone 23a of the first temperature controlling member 23 and each third zone of the second temperature controlling member 27 in the extrusion molding machine 3, and the temperature distribution of the molded body in the temperature distribution measuring step and the dimension of the molded body in the dimension measuring step can be determined based on past data accumulated by producing the molded bodies. Further, by reflecting the data obtained by continuously carrying out the method for producing the molded body according to Embodiment 3 of the present invention, that relationship can be optimized in real time.

The relationship between the temperatures of each first zone 23a of the first temperature controlling member 23 and each third zone of the second temperature controlling member 27 in the extrusion molding machine 3, and the temperature distribution of the molded body in the temperature distribution measuring step and the dimension of the molded body in the dimension measuring step may vary depending on conditions such as materials and sizes of the molded bodies, and the type of the extrusion molding machine 3. Therefore, that relationship is preferably obtained under the same conditions.

While the configurations different from those of the extrusion molding machine 1 according to Embodiment 1 of the present invention have been described above, the different configurations may also be applied to the extrusion molding machine 2 according to Embodiment 2 of the present invention. Needless to say, the effects as described above can be obtained in this case as well.

In this case, in the method for producing the molded body according to Embodiment 3 of the present invention, in the molding step, temperatures of each first zone 23a of the first temperature controlling member 23, each second zone of the die holding member 26b and each third zone of the second temperature controlling member 27 are determined based on results of the temperature distribution of the molded body measured in the temperature distribution measuring step and the dimension measured in the dimension measuring step. More particularly, the relationship between the temperatures of each first zone 23a of the first temperature controlling member 23, each second zone of the die holding member 26b and each third zone of the second temperature controlling member 27 in the extrusion molding machine, and the temperature distribution in the molded body in the temperature distribution measuring and the dimension of the molded body in the dimension measuring step is determined in advance, and based on the relationship, appropriate temperatures of each first zone 23a, each second zone and each third zone are calculated from the temperature distribution of the molded body measured in the temperature distribution measuring step and the dimension of the molded body measured in the dimension measuring step, and each first zone 23a, each second zone and each third zone are controlled to the appropriate temperatures in the molding step.

EXAMPLES

Hereinafter, the present invention will be described in more detail with reference to Examples, but the present invention is not limited to these Examples.

Example 1-1

Figure 5:
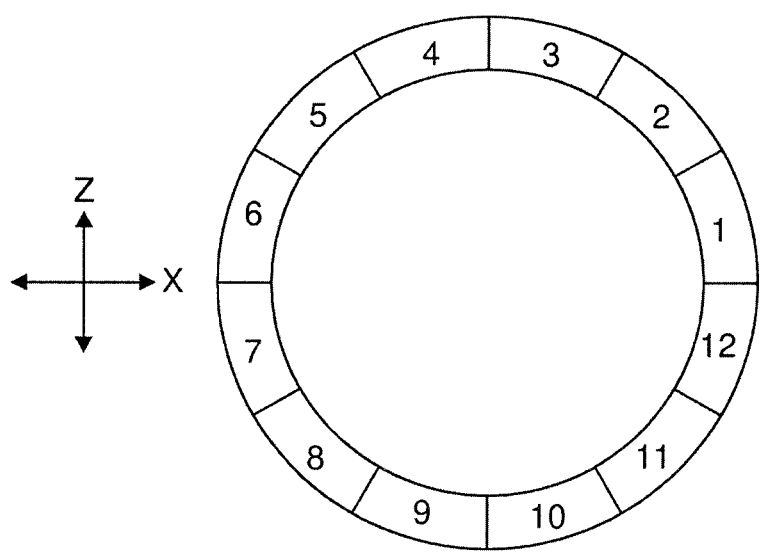
FIG. 5 is a cross-sectional view for explaining first zones of a first temperature controlling member used in Example.

The extrusion molding machine as shown in FIG. 1 was produced. In the first temperature controlling member, twelve first zones divided in the circumferential direction were formed as shown in FIG. 5, and each first zone was provided with a heating element, such that the temperatures of the first zones could be individually controlled. In FIG. 5, the X and Z directions are directions orthogonal to the extrusion direction, and in particular, the Z direction is a vertical direction. Further, one end of the molding portion was provided with a die capable of forming a ceramic honeycomb molded body in which the cross section orthogonal to the extrusion direction had an oval shape having a short diameter of 150 mm and a long diameter of 200 mm.

Subsequently, in the extrusion molding machine, the temperatures of the first zones of the first temperature controlling member were set to 30° C. for Nos. 2 to 5 and 8 to 11, and to 35° C. for Nos. 1, 6, 7 and 12. A ceramic molding material containing cordierite was used as the ceramic raw material, a ceramic honeycomb molded body was extruded in an amount of the molding material fed of 300 kg/h and at a rotation speed of the screw 11 of 55 rpm, and evaluated as described below.

Example 1-2

The extrusion molding machine shown in FIG. 3 was produced. The first temperature controlling member and the die were those having the same structures as those of Example 1-1. Further, the die holding member was provided with twelve second zones divided in the circumferential direction similar to the first zones of the first temperature controlling member, and each second zone was provided with a heating element such that the temperatures could be individually controlled.

Subsequently, in this extrusion molding machine, the temperatures of the first zones of the first temperature controlling member and the second zones of the die holding member were set to be the same temperature as that of the first zones of the first temperature controlling member, and a ceramic honeycomb molded body was extruded under the same conditions as those of Example 1-1, and evaluated as described below.

Comparative Example 1

Using an extrusion molding machine that was not provided with the first temperature controlling member, a ceramic honeycomb molded body was extruded under the same conditions as those of Example 1-1, and evaluated as described below.

(Dimensional Accuracy of Molded Body)

Each ceramic honeycomb molded body discharged from the die was cut to a predetermined length, and the shape of the cut surface (end face) was measured using an end face inspection machine (LJ-V7300 from KEYENCE CORPORATION). Specifically, after an image of the end face of each ceramic honeycomb molded body was taken by an imaging camera forming the end face inspection machine, the end face image was subjected to image analysis to obtain a contour (cross-sectional shape) of the ceramic honeycomb molded body. Further, a radius of the obtained cross-sectional shape was measured, a deviation (difference) from a reference radius was calculated every 1°, and a maximum value of the deviation was determined to be the maximum deviation. As used herein, the "reference radius" refers to a radius of a ceramic honeycomb molded body having a desired cross-sectional shape as a reference.

(Temperature Distribution of Molded Body)

The temperature distribution of the cross section orthogonal to the extrusion direction of the ceramic honeycomb molded body immediately after being discharged from the die was measured using an infrared thermography camera (Thermo GEAR G120EX from Nippon Avionics Co., Ltd.).

Figure 6:
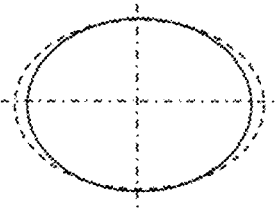
FIG. 6 shows the evaluation results for Example 1-1, Example 1-2 and Comparative Example 1.
Figure 6:
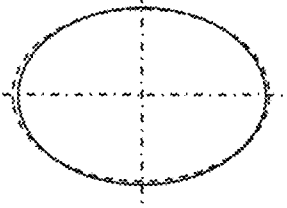
Figure 6:
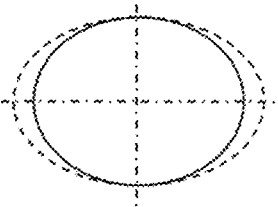
Figure 6:
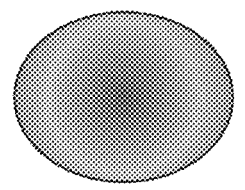
Figure 6:
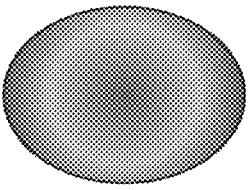
Figure 6:
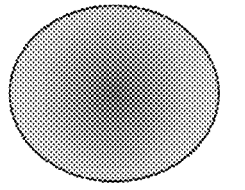

The evaluation results are shown in FIG. 6. In each cross-sectional shape in FIG. 6, the dotted line represents a cross-sectional shape of a ceramic honeycomb molded body having a desired cross-sectional shape as a reference, and the solid line represents a cross-sectional shape of a produced ceramic honeycomb molded body.

As shown in FIG. 6, when extrusion molding was carried out using the extrusion molding machine having the first temperature controlling member including a plurality of first zones (Examples 1-1 and 1-2), the dimensional accuracy of the outer circumference portion of the ceramic honeycomb molded body was improved as compared with the case where the extrusion molding was carried out using the extrusion molding machine that did not have the first temperature controlling member including a plurality of first zones (Comparative Example 1). Further, when extrusion molding was carried out using the extrusion molding machine further having the die holding member including a plurality of second zones (Example 1-2), the dimensional accuracy of the outer circumference portion of the ceramic honeycomb molded body was further improved.

Example 2

The extrusion molding machine as shown in FIG. 1 was produced. In the first temperature controlling member, twelve first zones divided in the circumferential direction were formed as shown in FIG. 5, and each first zone was provided with a heating element such that the temperatures could be individually controlled. Further, one end of the molding portion was provided with a die capable of forming a ceramic honeycomb molded body in which the cross section orthogonal to the extrusion direction had a rounded rectangular shape having a short diameter of 170 mm and a long diameter of 220 mm.

Subsequently, in this extrusion molding machine, the temperatures of the first zones of the first temperature controlling member were set to 30° C. for Nos. 3, 4, 9 and 10, and to 35° C. for Nos. 1, 2, 5 to 8, 11 and 12. Then, using a ceramic molding material containing cordierite as the ceramic raw material, a ceramic honeycomb molded body was extruded in an amount of the molding material fed of 300 kg/h and at a rotation speed of the screw 11 of 55 rpm, and evaluated.

Comparative Example 2

Using an extrusion molding machine that was not provided with the first temperature controlling member, a ceramic honeycomb molded body was extruded under the same conditions as those of Example 2, and evaluated.

Figure 7:
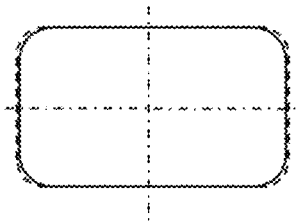
FIG. 7 shows the evaluation results for Example 2 and Comparative Example 2.
Figure 7:
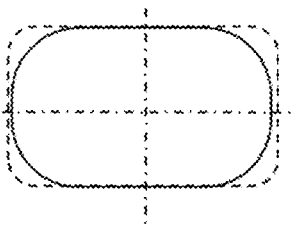
Figure 7:
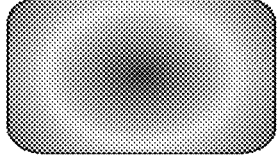
Figure 7:

FIG. 7 shows the evaluation results.

As shown in FIG. 7, in the case where the ceramic honeycomb molded body having the rounded rectangular cross section was extruded using the extrusion molding machine having the first temperature controlling member including a plurality of first zones (Example 2), the dimensional accuracy of the circumference portion of the ceramic honeycomb molded body was also improved as compared with the case where the extrusion molding was carried out using the extrusion molding machine that did not have the first temperature controlling member including a plurality of first zones (Comparative Example 2).

Example 3

The extrusion molding machine as shown in FIG. 1 was produced. In the first temperature controlling member, twelve first zones divided in the circumferential direction were formed as shown in FIG. 5, and each first zone was provided with a heating element such that the temperatures could be individually controlled. Further, one end of the molding portion was provided with a die capable of forming a ceramic honeycomb molded body in which the cross section orthogonal to the extrusion direction had a left-shifted elliptic shape having a short diameter of 150 mm and a long diameter of 200 mm.

Subsequently, in this extrusion molding machine, the temperatures of the first zones of the first temperature controlling member were set to 35° C. for Nos. 1 and 12, but not set for Nos. 2 to 11. Then, using a ceramic molding material containing cordierite as the ceramic raw material, a ceramic honeycomb molded body was extruded in an amount of the molding material fed of 300 kg/h and at a rotation speed of the screw 11 of 55 rpm, and evaluated.

Comparative Example 3

Using an extrusion molding machine that was not provided with the first temperature controlling member, a ceramic honeycomb molded body was extruded under the same conditions as those of Example 3, and evaluated.

Figure 8:
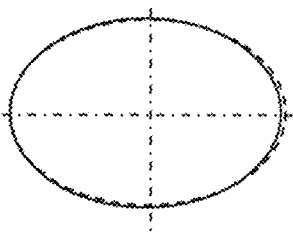
FIG. 8 shows the evaluation results for Example 3 and Comparative Example 3.
Figure 8:
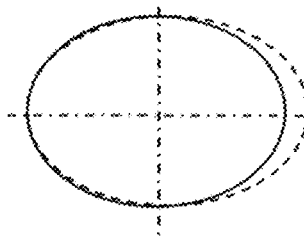
Figure 8:
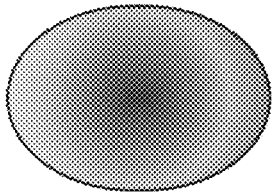
Figure 8:
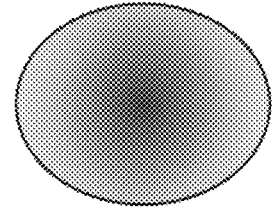

FIG. 8 shows the results of each evaluation.

As shown in FIG. 8, in the case where the ceramic honeycomb molded body having the left-shifted elliptical cross section was extruded using the extrusion molding machine having the first temperature controlling members including a plurality of first zones (Example 3), the dimensional accuracy of the outer circumference portion of the ceramic honeycomb molded body was also improved as compared with the case where the extrusion molding was carried out using the extrusion molding machine that did not have the first temperature controlling member including a plurality of first zones (Comparative Example 3).

As can be seen from the above results, according to the present invention, it is possible to provide an extrusion molding machine that can produce a molded body having higher dimensional accuracy of the outer circumference portion. Further, according to the present invention, it is possible to provide a method for producing a molded body having higher dimensional accuracy of the outer circumference portion.

DESCRIPTION OF REFERENCE NUMERALS 1, 2, 3 extrusion molding machine
10 extrusion portion
11 screw
12 barrel
13 extrusion port
14 screw shaft
15 screw portion
16 drive device
17 material input portion
20 molding portion
21 die
22 screen
23 first temperature controlling member
23a first zone
24 drum
25 diameter increased part
26a, 26b die holding member
27 second temperature controlling member

The invention claimed is:

1. An extrusion molding machine comprising a molding portion having one end and other end, the one end having a die, the other end being connected to an extrusion port of an extrusion portion, the molding portion also comprising a screen arranged therein,
   wherein the molding portion comprises: two or more first temperature controlling members disposed adjacent to each other in an axial direction of the molding portion between the screen and the die, each of the two or more first temperature controlling members comprising a plurality of first zones divided in a circumferential direction,
   wherein temperatures of the plurality of first zones can be individually controlled, and
   wherein a heat insulating member is arranged between the two or more first temperature controlling members.

2. The extrusion molding machine according to claim 1, wherein the number of the first zones is from 4 to 24.

3. The extrusion molding machine according to claim 1, wherein the molding portion further comprises a die holding member that holds the die and can control the temperature.

4. The extrusion molding machine according to claim 3, wherein the die holding member comprises a plurality of second zones divided in a circumferential direction, and wherein temperatures of the plurality of the second zones can be individually controlled.

5. The extrusion molding machine according to claim 4, wherein the number of the second zones is from 4 to 24.

6. The extrusion molding machine according to claim 1, wherein the molding portion has a diameter increased part between the other end and the screen, and wherein the diameter increased part is provided with a second temperature controlling member.

7. The extrusion molding machine according to claim 6, wherein the second temperature controlling member comprises a plurality of third zones divided in a circumferential direction, and wherein temperatures of the plurality of the third zones can be individually controlled.

8. The extrusion molding machine according to claim 7, wherein the number of the third zones is from 4 to 24.

9. The extrusion molding machine according to claim 1, wherein the extrusion molding machine is used for producing a ceramic molded body.

* * * * *